(12) United States Patent
Takamiya (10) Patent No.: US 7,616,878 B2
(45) Date of Patent: Nov. 10, 2009

(54) OPTICAL APPARATUS INCLUDING OPTICAL ELEMENT FOR DEFLECTING LUMINOUS FLUX

(75) Inventor: Makoto Takamiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 466 days.

(21) Appl. No.: 11/218,154

(22) Filed: Sep. 1, 2005

(65) Prior Publication Data

US 2006/0045507 A1  Mar. 2, 2006

(30) Foreign Application Priority Data

Sep. 1, 2004  (JP) ............................. 2004-254920

(51) Int. Cl.
*G02B 7/28* (2006.01)
(52) U.S. Cl. ...................... 396/111; 396/121
(58) Field of Classification Search ................ 396/111, 396/114, 121
See application file for complete search history.

(56) References Cited

U.S. PATENT DOCUMENTS

| | | | | |
|---|---|---|---|---|
| 4,373,791 A * | 2/1983 | Araki | ........................... | 396/92 |
| 4,572,476 A * | 2/1986 | Oinoue | ..................... | 250/201.8 |
| 4,916,473 A * | 4/1990 | Mukai et al. | ................ | 396/114 |
| 5,597,999 A * | 1/1997 | Kinba et al. | ............. | 250/201.7 |
| 5,623,365 A * | 4/1997 | Kuba | ........................... | 359/569 |
| 5,701,005 A * | 12/1997 | Meyers | ....................... | 250/226 |
| 6,124,924 A * | 9/2000 | Feldman et al. | ............ | 356/153 |
| 6,175,692 B1 * | 1/2001 | Onoda et al. | ................ | 396/104 |
| 6,297,909 B1 * | 10/2001 | Sensui | ........................ | 359/618 |
| 6,574,437 B2 * | 6/2003 | Sensui | ......................... | 396/81 |
| 6,700,316 B2 * | 3/2004 | Taniuchi et al. | ............. | 313/111 |
| 6,766,112 B2 * | 7/2004 | Kuwata et al. | .............. | 396/114 |
| 6,933,978 B1 * | 8/2005 | Suda | .......................... | 348/345 |
| 7,271,956 B2 * | 9/2007 | Ishii | ............................ | 359/569 |
| 2002/0196547 A1 * | 12/2002 | Kleemann et al. | .......... | 359/575 |

FOREIGN PATENT DOCUMENTS

EP  1345062 A2 *  9/2003

OTHER PUBLICATIONS

S. Mendis, et al., "CMOS Active Pixel Image Sensor", IEEE Transactions on Electronic Devices, vol. 41, No. 3, Mar. 1994, pp. 452-453.*
E.R. Fossum, "CMOS Image Sensors: Electronic Camera-on-a-Chip", IEEE Transactions on Electronic Devices, vol. 44, No. 10, Oct. 1997, pp. 1689-1698.*
Hecht, Eugene, "Schaum's Outline of Theory and Problems of Optics", McGraw-Hill, 1975, p. 175.*

* cited by examiner

*Primary Examiner*—Melissa J Koval
*Assistant Examiner*—Linda B Smith
(74) *Attorney, Agent, or Firm*—Cowan, Liebowitz & Latman, P.C.

(57) ABSTRACT

An optical apparatus is disclosed, which is suitable for the focus detection by the TTL phase difference detection method, and capable of producing a pair of phase difference images for focus detection with high accuracy. The optical apparatus comprises a deflection optical element which deflects at least one of first and second luminous fluxes with respect to the other. The first and second luminous fluxes are transmitted respectively through first and second areas of an exit pupil of an optical system, and then reach a photoelectric conversion element. The deflection direction of the luminous flux is different from the division direction of the first and second areas.

9 Claims, 10 Drawing Sheets

OPTICAL APPARATUS INCLUDING OPTICAL ELEMENT FOR DEFLECTING LUMINOUS FLUX

FIELD OF THE INVENTION

The present invention relates to optical apparatuses which perform the focus detection of an optical system.

BACKGROUND OF THE INVENTION

Many of single-lens reflex cameras perform auto focusing (AF) by the TTL (Through the Taking Lens) phase difference detection method. In the phase difference detection method, the luminous flux from an object taken by the taking lens is reflected by a movable mirror and led to a plane (primary imaging plane) equivalent to the light-receiving surface of a film or an image-pickup device. The luminous flux led to the equivalent plane is divided into two luminous fluxes (pupil division) by a secondary imaging optical system including a separator lens, and the two luminous fluxes are led to a pair of line sensors for AF. Then, the displacement of two images on the pair of line sensors, that is, a phase difference is detected, and thereby the displacement of the focus lens in the taking lens from an in-focus position can be obtained.

On the other hand, since the digital camera has an image-pickup device performing the photoelectric conversion of object image, the line sensors dedicated to AF and the secondary imaging optical system separated from the taking lens are not required if part of the image-pickup device is used as the AF sensor area.

Accordingly, a focus detection system has been disclosed in Japanese Patent Laid-Open No. 2004-46132 and, Aizo Suzuki, "Camera Technology Handbook", pp. 108-111, Shashin Kogyo Publishing, Jul. 15, 1979, in which part of the image-pickup device is used as AF sensor areas, and the luminous fluxes divided by an image splitting prism provided in the taking optical system are led to the areas.

Further, an AF system for the TTL phase difference detection method has been disclosed in Japanese Patent Laid-Open No. H04-147207, in which a holographic optical element is arranged on a side closer to the object than the primary imaging plane.

However, in the focus detection system disclosed in Japanese Patent Laid-Open No. 2004-46132, an object image larger than the image splitting prism is required unlike in the case where the TTL phase difference detection method is used. Further, there are some restrictions in this focus detection system. For example, if the shape of the image on the boundary of the image splitting prism is not linear, the system determines that the lens is in an out-of-focus state thought it is in an in-focus state. Therefore, it is not possible to obtain a focus detection performance equivalent to that of the TTL phase difference detection method.

Moreover, the method disclosed in Japanese Patent Laid-Open No. H04-147207, in which the holographic optical element is used, is the same as the TTL phase difference detection method in principle. However, the method uses the holographic optical element having a large chromatic dispersion for producing two images (phase difference images) in the direction of the pupil division, images which are important for the determination of the focus state. Therefore, the difference of the incident angles between the phase difference images, which is important for obtaining sufficient focus detection accuracy, changes greatly depending on wavelengths. Accordingly, the method is unrealistic to the focus detection.

BRIEF SUMMARY OF THE INVENTION

One object of the present invention is to provide an optical apparatus suitable for the focus detection by the TTL phase difference detection method, and capable of producing a pair of object images (phase difference images) for the focus detection with high accuracy.

An optical apparatus as one aspect of the present invention comprises a deflection optical element which deflects at least one of first and second luminous fluxes with respect to the other. The first and second luminous fluxes are transmitted respectively through first and second areas of an exit pupil of an optical system, and then reach a photoelectric conversion element. The deflection direction of the luminous flux is different from the division direction of the first and second areas.

An optical apparatus as another aspect of the present invention is an image-taking apparatus which comprises the deflection optical element, a photoelectric conversion element, and a focus detection system detecting the focus state of the optical system based on an output from the photoelectric conversion element. The output corresponds to the images formed by the first and second luminous fluxes.

An optical apparatus as still another aspect of the present invention is a lens apparatus which comprises the deflection optical element, an optical system, and a pupil dividing member that divides a luminous flux entering the optical system into first and second luminous fluxes transmitted respectively through first and second areas of an exit pupil of the optical system.

Other objects and further features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1A:
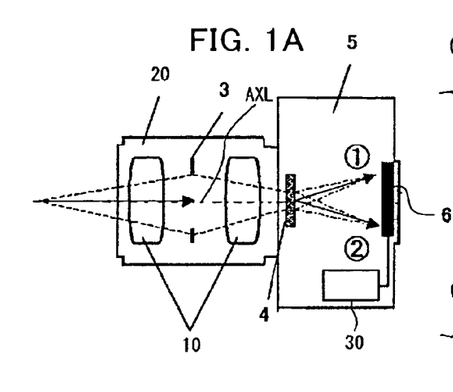
FIGS. 1A, 1B, and 1C are a side view and top views showing the structure of an image-taking system that is Embodiment 1 of the present invention.
Figure 1B:
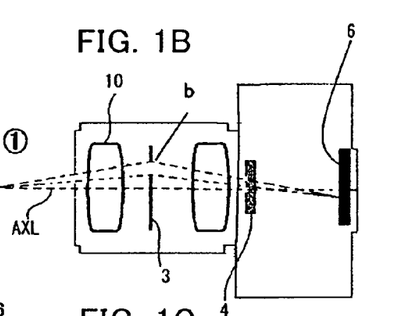
Figure 1C:
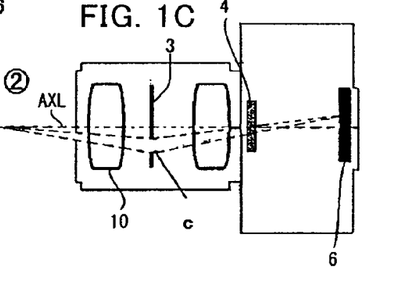

FIGS. 1A to 1C show the structure of the image-taking system that is Embodiment 1 of the present invention. FIG. 1A is a side view of the image-taking system, and FIGS. 1B and 1C are top views thereof.

In these figures, 20 denotes an interchangeable lens having a taking optical system, and 10 lenses constituting the taking optical system. Although FIGS. 1A to 1C show only two lenses 10, the actual taking optical system is constituted by more lenses. 3 denotes a pupil-dividing aperture stop arranged at the position of the exit pupil of the taking optical system or at the vicinity thereof.

5 denotes a camera body (image-taking apparatus) on which the interchangeable lens 2 is mountable. 6 denotes an image-pickup element which is a photoelectric conversion element that converts an object image formed by the taking optical system into an electronic signal. 4 denotes a light deflection unit arranged on a side closer to the object than the image-pickup element 6. 30 denotes a controller which functions as a focus detection unit detecting (calculating) the focus state of the taking optical system using the output signals from the image-pickup element 6, and performs focusing control of the lens 10 based on the focus detection results.

FIG. 1B shows a first luminous flux 1 passing through an opening (first area) b of the pupil-dividing aperture stop 3. The first luminous flux 1 is a part of the luminous flux which entered the taking optical system and shown by circled 1 in the figure. FIG. 1C shows a second luminous flux 2 passing through an opening (second area) c of the pupil-dividing aperture stop 3. The second luminous flux 2 is another part of the luminous flux which entered the taking optical system and shown by circled 2 in the figure. The luminous flux, which entered the taking optical system, is divided into two luminous fluxes by the pupil-dividing aperture stop 3, and they progress toward the light deflection unit 4. In other words, the exit pupil is divided into two areas corresponding to the openings b and c. Hereinafter, this is referred to as 'pupil division'.

Figure 3:
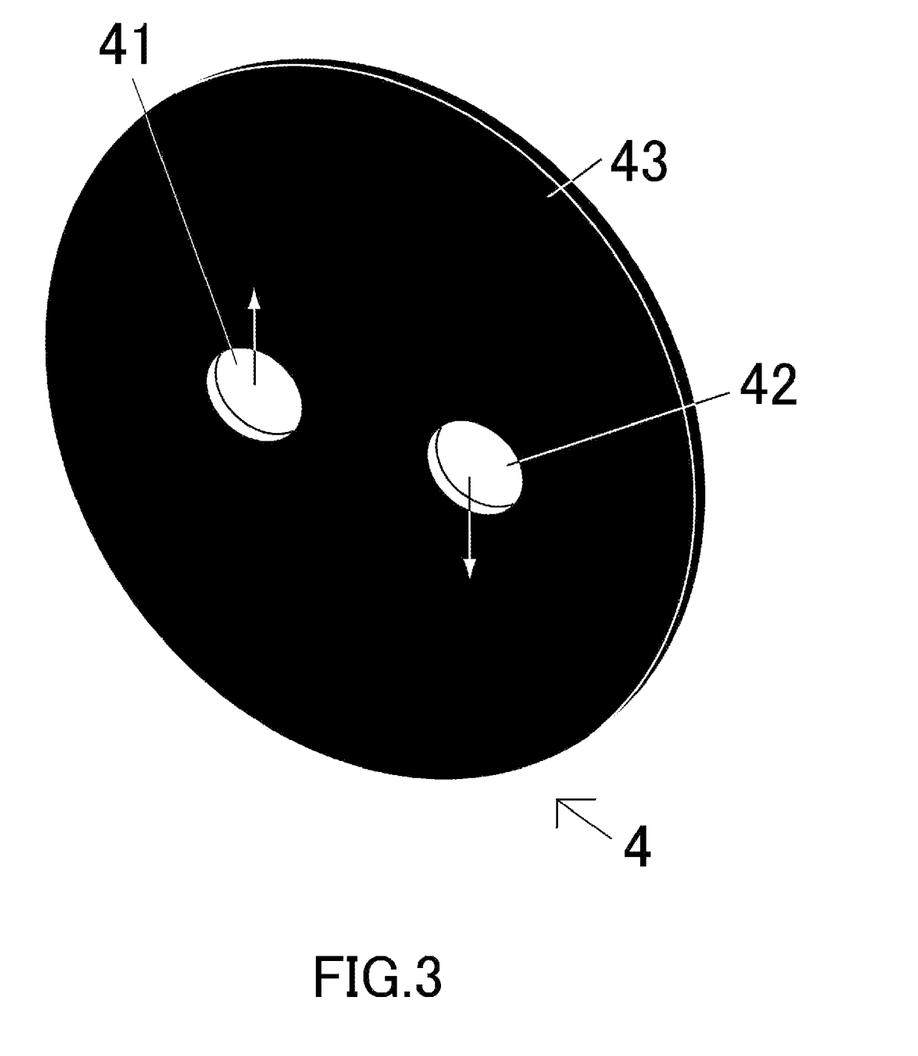
FIG. 3 is pattern diagram showing a light deflection unit used in Embodiment 1.

As shown in FIG. 3, the openings b and c are formed in the left area and right area of the pupil-dividing aperture stop 3 (upper area and lower area in FIGS. 1B and 1C) across the optical axis AXL of the taking optical system. Further, first and second deflection optical elements 41 and 42 are provided in the left area and right area of the light deflection unit 4 across the optical axis AXL.

The first luminous flux 1 that has passed through the opening b of the pupil-dividing aperture stop 3 is deflected upward by the first deflection optical element 41, and the second luminous flux 2 that has passed through the opening c is deflected downward by the second deflection optical element 42. In other words, the first and second luminous fluxes 1 and 2 are deflected in directions different from the direction in which the openings b and c are divided (pupil division direction) and different from each other.

In this embodiment, the first and second luminous fluxes 1 and 2 are deflected in directions substantially orthogonal to the pupil division direction and opposite to each other.

Although, in this embodiment, the pupil-dividing aperture stop is described, in which the openings are formed in the aperture stop member as one member, desired openings for the pupil division may be formed by the combination of a plurality of aperture stop members.

Figure 4A:
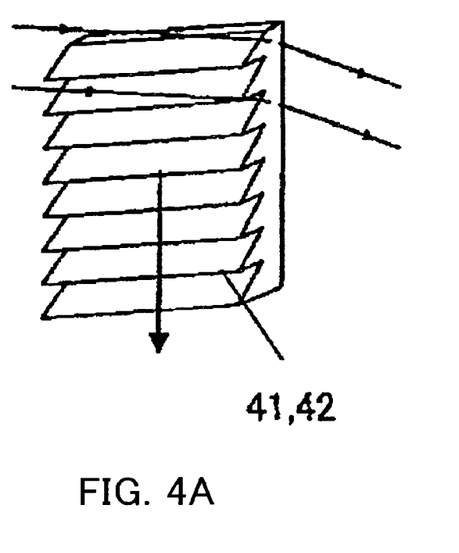
FIGS. 4A and 4B are pattern diagrams showing a deflection optical element used in Embodiment 1.
Figure 4B:
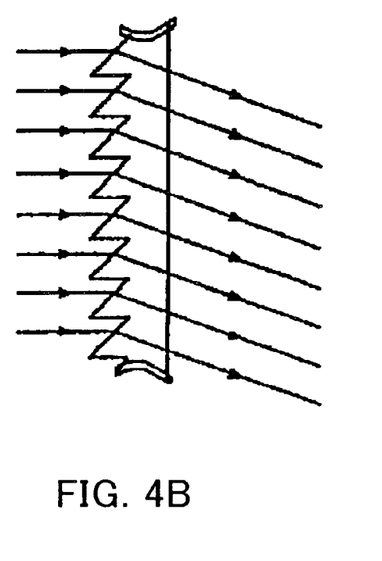

FIGS. 4A and 4B show the rough configuration of the deflection optical element. This embodiment's deflection optical element is a prism sheet having a so-called blazed shape in which saw-tooth portions or triangular prism portions are arranged serially in the specific direction shown by the arrow in FIG. 4A (linear blazed prism sheet), for example. The deflection angle of the entering luminous flux is determined by diffraction conditions in the deflection optical element. In such a deflection optical element, the entering luminous flux is deflected in the above-mentioned specific direction, that is, the blaze direction. Therefore, the first and second deflection optical elements 41 and 42 whose blaze directions are opposite to each other can deflect the first and second luminous fluxes 1 and 2 in the directions opposite to each other.

It is preferable to set the pitch of the saw-tooth portions or triangular prism portions to 0.5 mm, for example, so that the influence of diffraction on the first and second luminous fluxes 1 and 2 may be small.

A linear blazed diffraction grating may be used, which can deflect the entering luminous flux using diffraction phenomenon of light. In this case, the formula of diffraction conditions determines the deflect angle, and the dispersion direction becomes opposite to refraction conditions.

The light deflection unit 4 holds the first and second deflection optical elements 41 and 42, and has an image-height restriction mask 43 shielding light in the circumference of the deflection optical elements 41 and 42.

The light deflection unit 4 configured as above deflects the first and second luminous fluxes 1 and 2 upward and downward, respectively, while restricting the image height. The arrows in FIG. 3 show the deflection direction of light and the blaze direction of each deflection optical element.

The first and second luminous fluxes 1 and 2 form height-restricted optical images (hereinafter, they are referred to as AF images) in two areas different from each other on the light-receiving surface of the image-pickup element 6, respectively. The division direction (vertical direction) of the two AF images is substantially orthogonal to the pupil division direction (horizontal direction).

FIGS. 5A to 5H show the principle of the focus state detection of the taking optical system in this embodiment. In particularly, the figures show how the positions of the AF images formed by the luminous fluxes deflected by the light deflection unit 4 change with respect to the central pixel of the image-pickup element 6 depending on the focus state of the taking optical system.

Figure 5A:
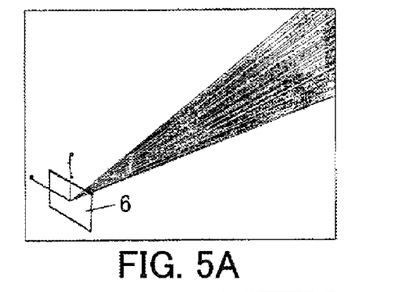
FIGS. 5A to 5H are diagrams for explaining the principle of the focus detection method used in Embodiment 1.

FIG. 5A shows a luminous flux progressing toward the central pixel of the image-pickup element 6 in a case where the light deflection unit 4 is not provided. FIG. 5E shows the light intensity detected by the image-pickup element 6 in this case; the light intensity concentrates on the central pixel. The light intensity is viewed from the backside of the light-receiving surface of the image-pickup element 6 in this figure and other figures.

Figure 5B:
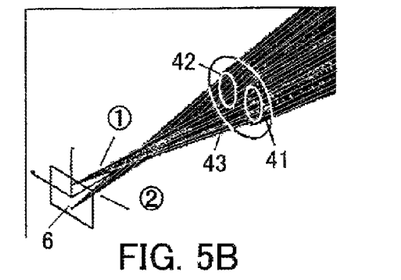

FIG. 5B shows an appearance in which the luminous fluxes 1 and 2 respectively deflected upward and downward by the light deflection unit 4 are forming the AF images on the light-receiving surface of the image-pickup element 6 in an in-focus state of the taking optical system. FIG. 5F shows the light intensity on the image-pickup element 6 in this state. In this state, the first luminous flux 1 converges on the upper side, and the second luminous flux 2 converges on the lower side; the barycenters of the light intensities of the first and second luminous fluxes 1 and 2 are located at the center in the horizontal direction.

Figure 5C:
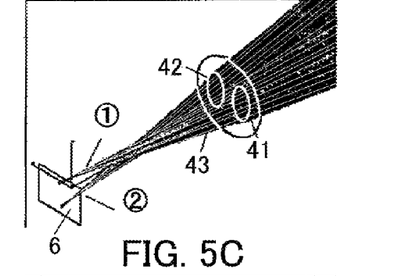
Figure 5D:
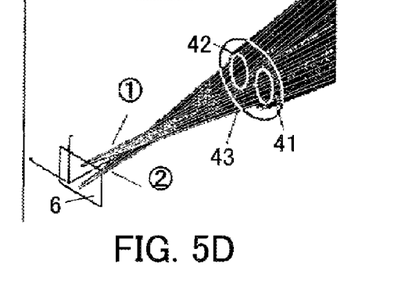
Figure 5E:
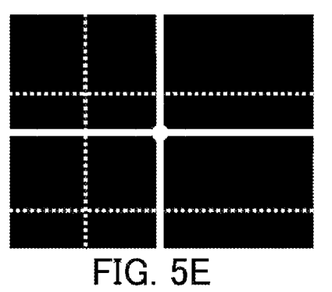
Figure 5F:
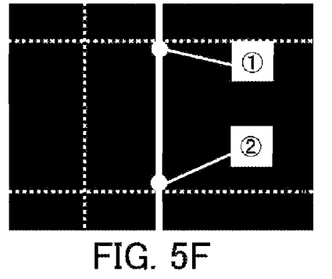
Figure 5G:
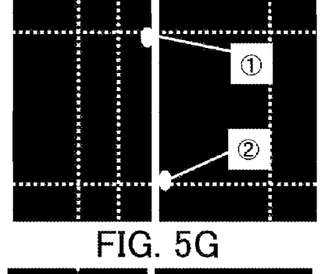

FIGS. 5C and 5G show an appearance of the first and second luminous fluxes 1 and 2 and their light intensities in a front focus state. As shown in the figures, the barycenters of the light intensities of the first and second luminous fluxes 1 and 2 change little in the vertical direction in this front focus state compared to the in-focus state shown in FIGS. 5B and 5F. However, the barycenters changes significantly in the horizontal direction; the barycenter of the light intensity of the first luminous flux 1 shifts to the left, and that of the second luminous flux 2 shifts to the right.

Figure 5H:
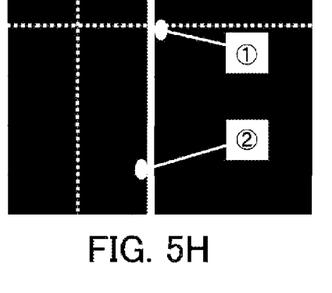

On the other hand, FIGS. 5D and 5H show an appearance of the first and second luminous fluxes 1 and 2 and their light intensities in a rear focus state. In this state, the barycenter the light intensity of the first luminous flux 1 shifts to the right, and that of the second luminous flux 2 shifts to the left, contrary to the front focus state.

The controller 30 calculates the above-described positional relationship of the barycenters of the light intensities of the first and second luminous fluxes 1 and 2, and the shift amount thereof to detect the focus state of the taking optical system.

Here, the deflection optical elements 41 and 42 deflect the first and second luminous fluxes 1 and 2 forming the AF images in the different directions, however the luminous flux projected on a plane (projection plane) that includes a line connecting the centers of two divided pupils (namely, the first and second openings b and c) and the optical axis AXL is not deflected by the deflection optical elements 41 and 42. The originally important thing to detect the focus state is the incident angle of rays on the projection plane from the divided pupils. Since the direction of the rays is not changed in this embodiment, the AF image for detecting the focus state does not deteriorate.

As for the direction orthogonal to the projection plane, the deflection of the luminous fluxes by the deflection optical elements 41 and 42 causes chromatic dispersion. However, when processing the information generated by the photoelectric conversion of the AF images by the image-pickup element 6, the controller 30 processes the information corresponding to a plurality of pixels in the direction orthogonal to the projection plane as integrated AF image information (that is, a single piece of AF image information). Consequently, the aberrations caused by the chromatic dispersion can be averaged, thereby making the influence of the chromatic dispersion on the focus detection small.

Figure 6A:
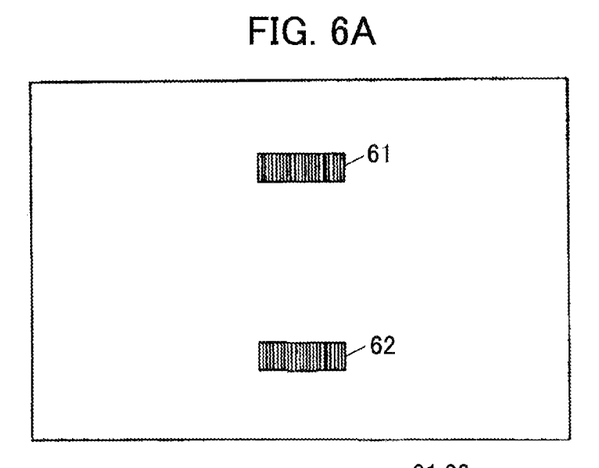
FIGS. 6A to 6C are explanatory diagrams showing AF-image detection areas of an image-pickup element in Embodiment 1.
Figure 6B:
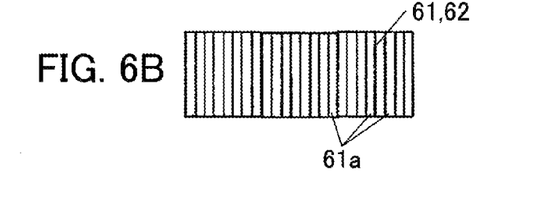
Figure 6C:
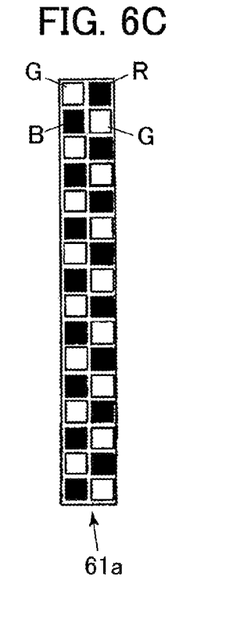

FIG. 6A shows the AF-image detection areas 61 and 62, which photoelectrically convert the AF images on the light-receiving surface of the image-pickup element 6. FIG. 6B is an enlarged view of the AF-image detection areas 61 and 62. In each AF-image detection area, a plurality of pixel blocks 61*a* are arranged in the horizontal direction, each pixel block 61*a* being constituted by pixels that form two lines extending in the vertical direction (narrow side direction of the image-pickup element 6). FIG. 6C shows the arrangement of color filters in one pixel block.

In this embodiment, the color filters of red (R), green (G), and blue (B) are arranged for respective pixels in the Bayer arrangement. A CCD sensor or CMOS sensor may be used as the image-pickup element 6.

An additive process in which the pixel block 61*a* shown in FIG. 6C is treated as a unit pixel in the AF image detection averages the AF image information including color information in the vertical direction. Since the unit pixel in the horizontal direction has an area of two pixels, which originally corresponds to the resolution of the image-pickup element 6, it is possible to ensure a sufficient resolution for detecting the shift amount of the AF images while suppressing the influence of chromatic dispersion.

Then, performing an autocorrelation process to the shift amount of the light intensity distributions of the paired AF images obtained as above makes it possible to detect the focus displacement amount (defocus amount) of the taking optical system.

Further, employing a method in which the shift amount of the AF images is detected for each of the color filters in the pixel block 61*a* shown in FIG. 6C makes it possible to appropriately extract the peak of the light intensity for each color of the taken image. This makes it possible to detect the focus state accurately when taking various object images.

Figure 7A:
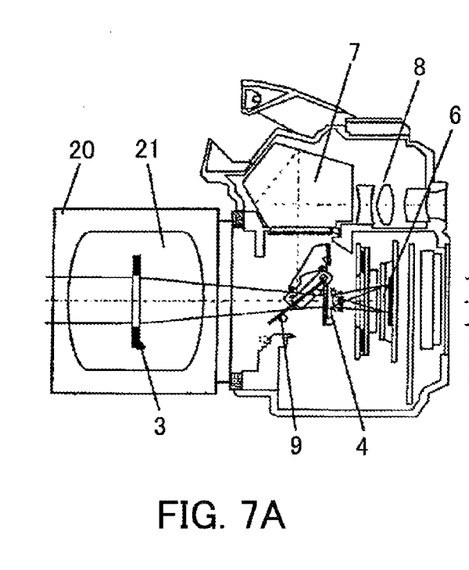
FIGS. 7A and 7B are side views showing the appearances of a single-lens reflex digital camera at the time of focus detection and at the time of image-taking, respectively.

FIG. 7A shows a more concrete embodiment of a single-lens reflex digital camera using this embodiment's focus detection method. 20 denotes the interchangeable lens, 21 a taking optical system provided in the interchangeable lens 20. 3 denotes the aperture stop provided in the taking optical system 21. 5 denotes the camera body on which the interchangeable lens 20 is mountable, and 6 the image-pickup element provided in the camera body 5. 7 denotes a penta prism provided in the camera body 5, 8 an eyepiece lens, and 9 a quick-return mirror having a half mirror portion. 4 denotes the light deflection unit provided on a side closer to the image-pickup element 6 than the quick-return mirror 9. The quick-return mirror 9 and the light deflection unit 4 move in and out of the optical path from the taking optical system 21 to the image-pickup element 6.

FIG. 7A shows a state in which the focus detection of the taking optical system 21 is performed. In this state, the quick-return mirror 9 and the light deflection unit 4 is located in the optical path from the taking optical system 21 to the image-pickup element 6. Further, pupil-dividing openings as shown in FIG. 3 are formed in the aperture stop 3 in this state. Thereby, the luminous fluxes that have passed through the aperture stop 3 and half mirror portion of the quick-return mirror 9, and then deflected by the light deflection unit 4, in other words, the first and second luminous fluxes 1 and 2 described using FIGS. 1A to 1C form the AF images. Further, a luminous flux reflected by the quick-return mirror 9 is led to the eyepiece lens 8 via the penta prism 7, thereby making it possible for a user to observe an object.

On the other hand, the light deflection unit 4 arranged on the side closer to the image-pickup element 6 than the quick-return mirror 9 deflects the first luminous flux 1 upward, and the second luminous flux 2 downward as described using FIGS. 1A to 1C. Thereby, it is possible to detect the focus state of the taking optical system 21 as described using FIG. 5.

The controller 30 shown in FIG. 1A calculates the in-focus position of a focus lens (any one of the lenses 10 in FIG. 1A) including the taking optical system 21 based on the detected focus state, and then drives the focus lens with an actuator, not shown. Thus, the auto focusing is performed. Since the information of the paired AF images can hereat be obtained from the image-pickup element 6, it is possible to quantitatively calculate the drive direction and drive amount of the focus lens.

According to this embodiment, since a conventional secondary imaging sensor dedicated to AF and a secondary imaging optical system attendant thereon such as a separator lens are not required, it is possible to simplify the configuration of the camera body. Furthermore, in a case where the secondary imaging optical is used, the relative displacement between the optical axes of the taking optical system and secondary imaging optical system causes deterioration of the AF performance. In contrast, this embodiment has little worries caused by such a configuration, thereby making it possible to obtain a stable AF performance.

Figure 7B:
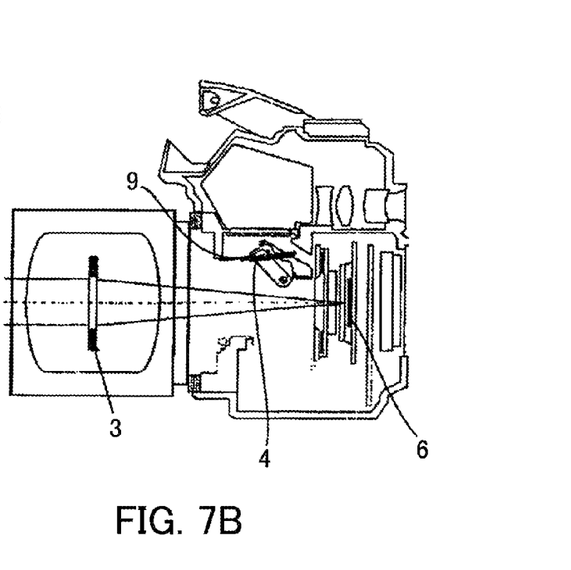

FIG. 7B shows an appearance of the image-taking system at the time of image-taking. In this state, the quick-return mirror 9 and the light deflection unit 4 is located out of the above-mentioned optical path. The aperture size of the aperture stop 3 is set to a size set by the user or selected automatically by the controller 30. Thereby, the luminous flux that has passed through the aperture stop 3 forms an image on the image-pickup element 6 without being intercepted by the quick-return mirror 9 and light deflection unit 4.

According to the above configuration, the camera (image-taking system) of this embodiment can form stable AF images without deteriorating the quality of taken images compared to conventional image-taking systems.

Figure 8:
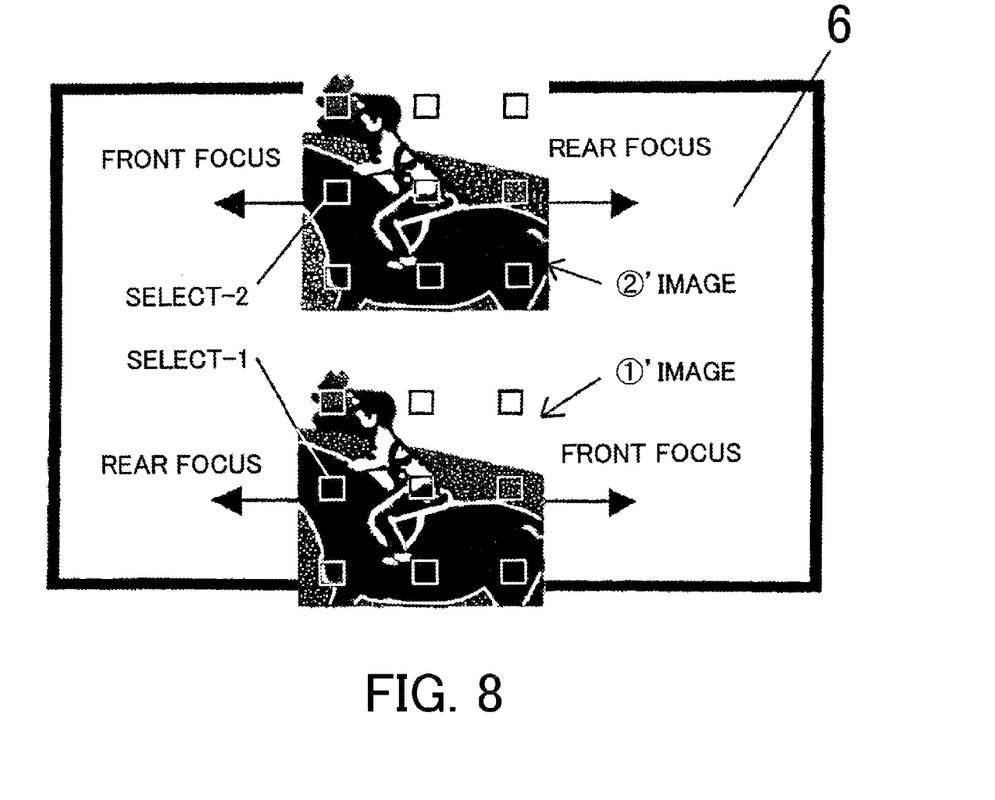
FIG. 8 is a pattern diagram showing an AF image in Embodiment 1.

FIG. 8 shows AF images 1' and 2' (circled 1' and 2' in the figure) formed by the first and second luminous fluxes 1 and 2 in focus detection state shown in FIG. 7A. This figure shows the AF images on the light-receiving surface of the image-pickup element 6 viewed from a position opposed to the light-receiving surface (front side position); the AF images, which are inverted images originally, are inverted vertically (namely, the images are rotated by an angle of 180 degrees around the optical axis).

In the front focus state as shown in FIGS. 5C and 5G, the lower AF image 1' shifts to the right, and the upper AF image 2' shifts to the left. In contrast, in the rear focus state as shown in FIGS. 5D and 5H, the lower AF image 1' shifts to the left, and the upper AF image 2' shifts to the right.

In this case, the two AF images are approximately equivalent to the actual taken image though they have a chromatic aberration in the vertical direction. Therefore, in a case where, for example, the user selected an off-center area, which is the peripheral area corresponding to 'select-1' and 'select-2', of the plural focus detection areas in the image-taking region by the image-pickup element 6 (the focus detection areas are shown by rectangular frames in FIG. 8), setting the AF-image detection areas 61 and 62 in the image-pickup element 6 shown in FIG. 6A in accordance with the selected peripheral area makes it possible to perform the AF by the TTL phase difference detection method not only at the center of the image-taking region but also at the periphery thereof.

As described above, according to this embodiment, it is possible to form AF images with little aberration in different areas of the image-pickup element at the same time, and perform an AF control with stability and high accuracy.

Further, using a linear blazed prism sheet and a linear blazed diffraction grating as the deflection optical element makes it possible to increase the deflection efficiency of luminous fluxes, and prevent deterioration of the AF images caused by stray light.

Moreover, by detecting the AF images, which are formed by the paired luminous fluxes that have been generated by the pupil division, in different areas of the image-pickup element and obtaining the focus state based on the state of the AF images, it is possible to use the image-pickup element for taking object images as an AF sensor, and eliminate a sensor dedicated to AF.

Furthermore, providing the image-height restriction mask makes it possible to appropriately set the image height of the AF images formed in the finite light-receiving area of the image-pickup element.

Moreover, by extracting the AF image information detected in the pixel-line direction (pixel block) of the image-pickup element as a single piece of AF image information, direction which is substantially orthogonal to the pupil division direction, and by averaging the AF image information in the pixel-line direction, it is possible to largely eliminate the influence of chromatic dispersion of the deflection optical element in the direction substantially orthogonal to the pupil division direction.

Furthermore, obtaining the AF image information for each color of the color filters provided in the image-pickup element makes it possible to color separate the chromatic dispersion of the deflection optical element in the direction substantially orthogonal to the pupil division direction. Therefore, it is possible to reduce the influence of the chromatic dispersion on the AF image detection for each color.

Embodiment 2

Figure 9A:
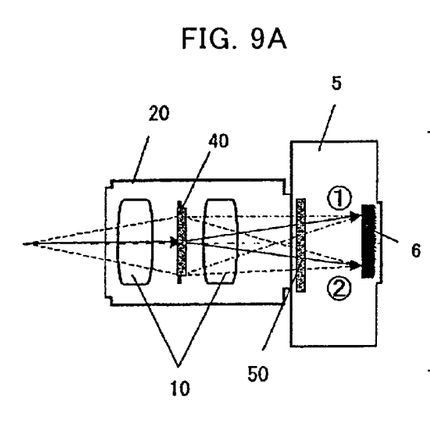
FIGS. 9A, 9B, and 9C are a side view and top views showing the structure of an image-taking system that is Embodiment 2 of the present invention.
Figure 9B:
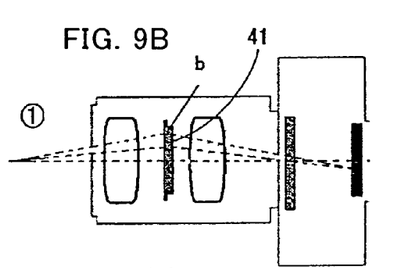
Figure 9C:
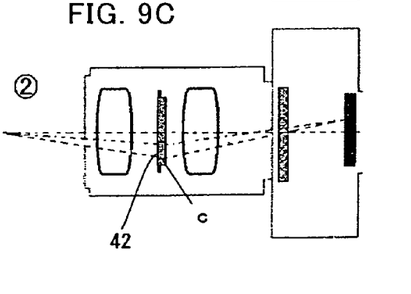

FIGS. 9A to 9C shows the structure of the image-taking system that is Embodiment 2 of the present invention. FIG. 9A is a side view of the image-taking system, and FIGS. 9B and 9C are top views of the image-taking system.

In these figures, 20 denotes an interchangeable lens having a taking optical system, and 10 lenses constituting the taking optical system. Although FIGS. 9A to 9C show only two lenses 10, the actual taking optical system is constituted by more lenses.

Figure 2:
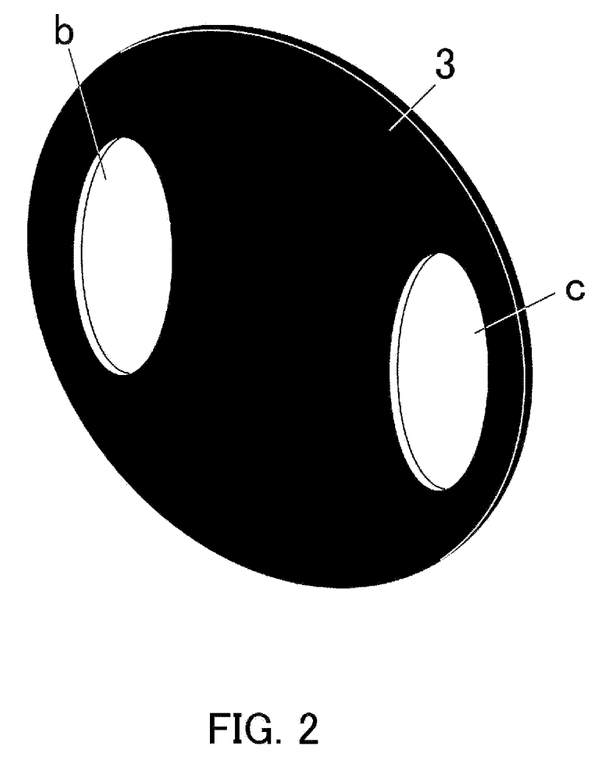
FIG. 2 is a pattern diagram showing a pupil-dividing aperture stop used in Embodiment 1.

40 denotes a light deflection unit arranged at the position of the exit pupil of the taking optical system or at the vicinity thereof, the light deflection unit 40 also functioning as a pupil-dividing aperture stop. The light deflection unit 40 has openings b and c as shown in FIG. 2, and deflection optical elements 41 and 42 as shown in FIGS. 4A and 4B are provided in the openings b and c. 5 denotes a camera body (image-taking apparatus) on which the interchangeable lens 20 is mountable. 6 denotes an image-pickup element, and 50 an image-height restriction mask.

FIGS. 9B and 9C show a first luminous flux 1 which is shown by circled 1 in the figures and passes through the opening b (deflection optical element 41) of the light deflection unit 40 doubling as the pupil-dividing aperture stop, and a second luminous flux 2 which is shown by circled 2 in the figures and passes through the opening c (deflection optical element 42). The first luminous flux 1 is deflected upward by the deflection optical element 41, and the second luminous flux 2 is deflected downward by the deflection optical element 42, as shown in FIG. 9A.

Figure 10:
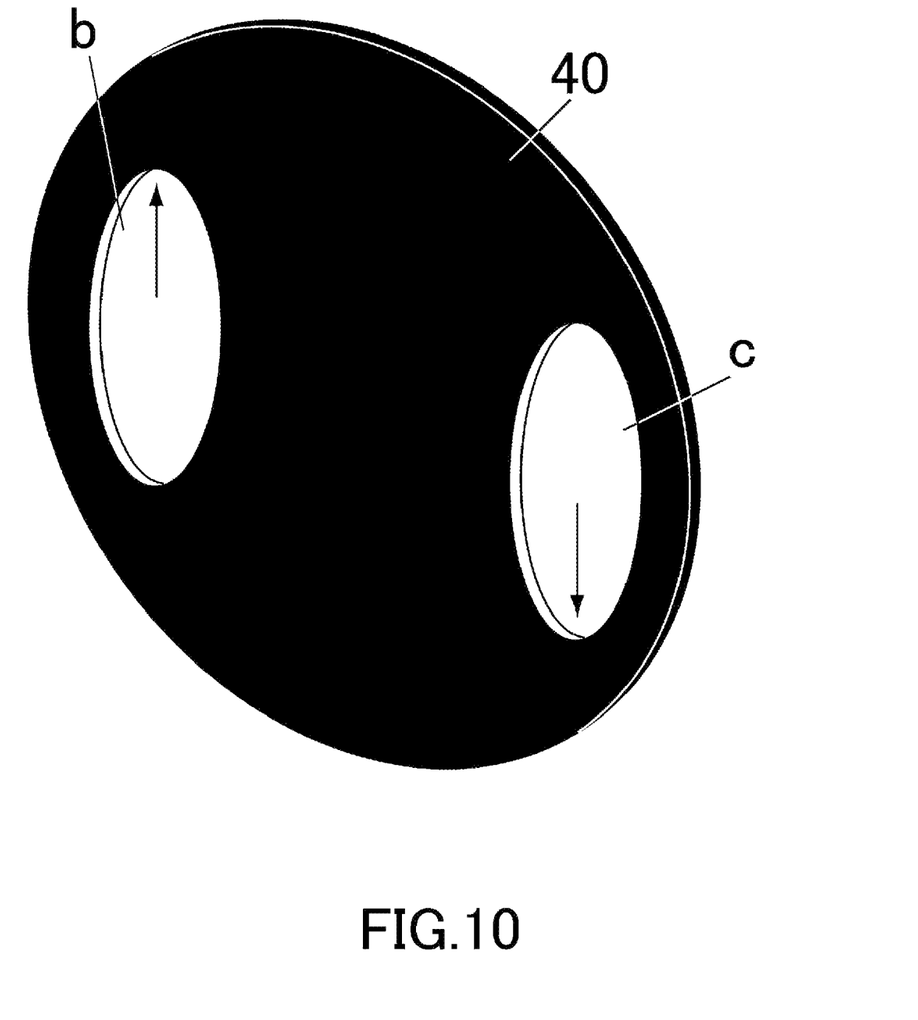
FIG. 10 is a pattern diagram showing a light deflection unit which is also a pupil-dividing aperture stop used in Embodiment 2.

FIG. 10 schematically shows the light deflection unit 40 doubling as the pupil-dividing aperture stop. The openings b and c are divided in the horizontal direction. The deflection optical element 41 whose blaze direction is upward to deflect the first luminous flux 1 upward is integrally provided in the opening b. The deflection optical element 42 whose blaze direction is downward to deflect the second luminous flux 2 downward is integrally provided in the opening c.

Although, in this embodiment, the pupil-dividing aperture stop (light deflection unit) is described, in which the openings are formed in the aperture stop member as one member, openings for the pupil division and deflection optical elements may be provided by the combination of a plurality of aperture stop members.

Figure 11:
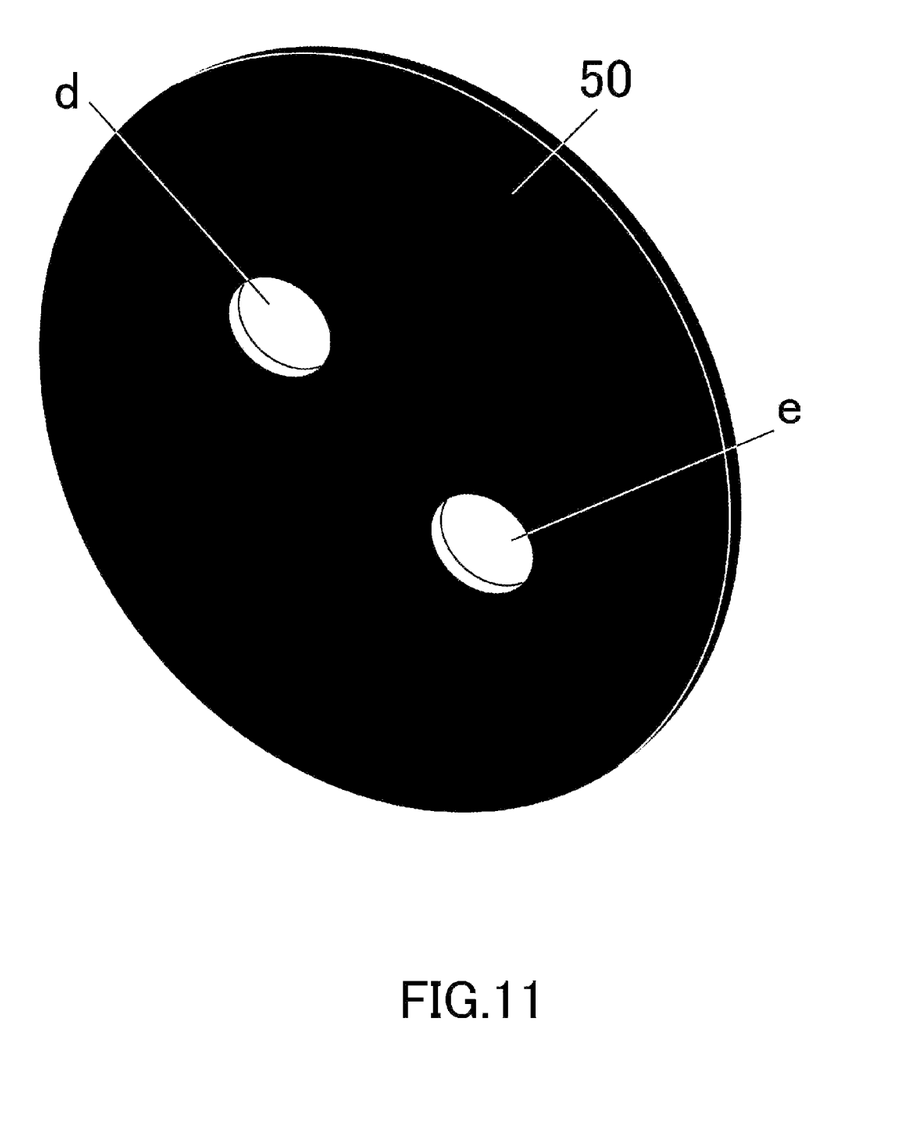
FIG. 11 is a pattern diagram showing an image-height restriction mask in Embodiment 2.

FIG. 11 schematically shows the image-height restriction mask 50. The image-height restriction mask 50 has an opening d through which only a luminous flux progressing toward the upper area of the image-taking element 6 of the first luminous flux 1 deflected by the light deflection unit 40. The image-height restriction mask 50 has an opening e which is separated from the opening d and through which only a luminous flux progressing toward the lower area of the image-taking element 6 of the second luminous flux 2 deflected by the light deflection unit 40. Providing such a image-height restriction mask 50 makes it possible to prevent an AF image formed by the first luminous flux 1 deflected upward and an AF image formed by the second luminous flux 2 deflected downward from overlapping on the image-pickup element 6, thereby making it possible to certainly form paired AF images which are separated from each other.

As described above, according to each embodiment, by deflecting at least one of the first and second luminous fluxes generated by the pupil division in a direction different from the pupil division direction, it is possible to form the AF images with little aberration in different areas of the image-pickup element. Therefore, when the auto focusing is performed based on the detection results of the AF images, it is possible to obtain a focus detection performance with high accuracy.

Although the description was made of a single-lens reflex camera system with an interchangeable lens in the above-mentioned embodiments, the present invention can be applied to other camera systems such as a camera system with a lens.

Further, although the description was made of a case where the deflection optical elements deflect the divided first and second luminous fluxes in directions opposite to each other in the above-mentioned embodiments, another configuration may be employed, in which only one of the first and second luminous fluxes is deflected and led to the image-pickup element, and the other is led to the image-pickup element without being deflected. In this case, the paired AF images are formed in the upper area and central area of the image-pickup element.

Moreover, although the description was made of a case where the light deflection unit deflects the first and second luminous fluxes in a direction substantially orthogonal to the pupil division direction of the pupil-dividing aperture stop in the above-mentioned embodiments, the deflection direction in the present invention is not limited thereto, and any deflection direction different from the pupil division direction may be selected.

Furthermore, although the description was made of a case where the two luminous fluxes divided by the pupil-dividing aperture stop form the two AF images in the above-mentioned embodiments, more number of divided luminous fluxes such as four luminous fluxes may be used to form the corresponding number of AF images, and the focus detection may be performed with arbitrarily-selected AF images.

Furthermore, although the description was made of a case where a deflection optical element having a blazed shape in the above-mentioned embodiments, other optical elements may be used, which deflect a luminous flux, and generate little aberration.

This application claims foreign priority benefits based on Japanese Patent Application No. 2004-254920, filed on Sep. 1, 2004, which is hereby incorporated by reference herein in its entirety as if fully set forth herein.

What is claimed is:

1. An optical apparatus comprising:
    a photoelectric conversion element;
    a deflection optical element which has a blazed shape and deflects first and second luminous fluxes with respect to the other in a deflection direction, the first luminous fluxes being transmitted through first area of the deflection optical element and the second luminous fluxes being transmitted through second area of the deflection optical element, which are divided from each other in a division direction, and then reaching the photoelectric conversion element,
    wherein the deflection direction of the first and second luminous fluxes by the deflection optical element is different from the division direction of the first and second areas.

2. The optical apparatus according to claim 1, wherein the optical apparatus includes a first deflection optical element which deflects the first luminous flux in a first deflection direction, and a second deflection optical element which deflects the second luminous flux in a second deflection direction different from the first deflection direction, and
    wherein each of the first and second deflection elements has the blazed shape, and their blaze directions are different from each other.

3. The optical apparatus according to claim 1, further comprising an image-height restriction member which restricts the height of the images formed by the first and second luminous fluxes.

4. The optical apparatus according to claim 1, wherein the first and second luminous fluxes form images in areas different from each other on the photoelectric conversion element.

5. The optical apparatus according to claim 1, wherein the optical apparatus is an image-taking apparatus which further comprises:
    a focus detection system detecting the focus state of the optical system based on an output from the photoelectric conversion element, the output corresponding to the images formed by the first and second luminous fluxes.

6. The optical apparatus according to claim 5, wherein the photoelectric conversion element is an image-pickup element for taking an object image.

7. The optical apparatus according to claim 5, wherein the focus detection system generates a single piece of image information based on outputs from a plurality of pixels arranged in a direction substantially orthogonal to the division direction of the first and second areas in the photoelectric conversion element, and detects the focus state based on the single piece of image information.

8. The optical apparatus according to claim 5, wherein the photoelectric conversion element includes color filters, and the focus detection system detects the focus state for each group of pixels associated with one of colors of color filters.

9. An image-taking system comprising:
    the optical apparatus according to claim 5, and
    a lens apparatus which is mountable on the optical apparatus, the lens apparatus including the optical system and a pupil dividing member that divides a luminous flux entering the optical system into the first and second luminous fluxes transmitted respectively through the first and second areas of the deflection optical element.

* * * * *